June 27, 1967
HAJIME ARIGA
3,327,694
FUEL SAVING DEVICE FOR AN AUTOMOBILE HAVING A CARBURETOR
Filed Oct. 13, 1965
4 Sheets-Sheet 1
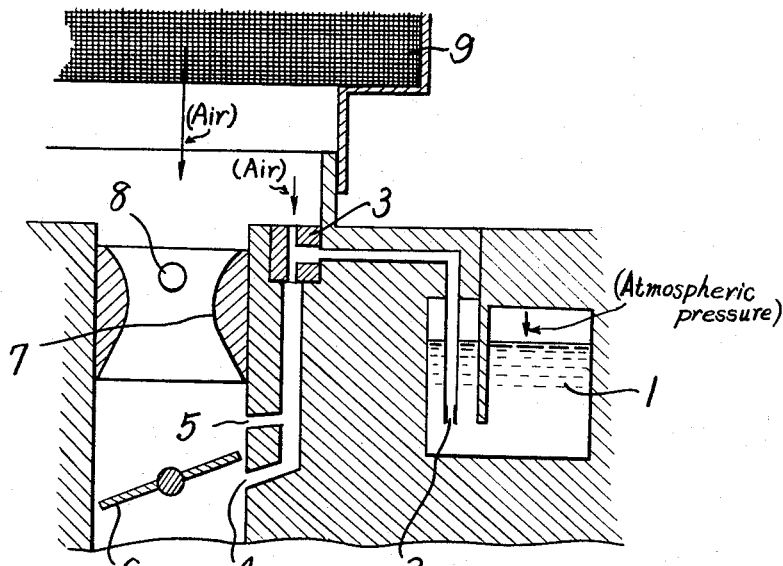
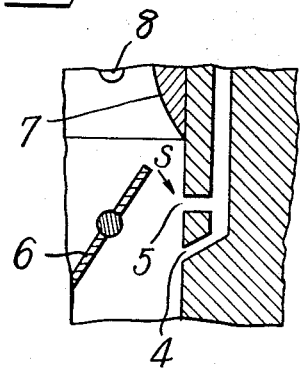
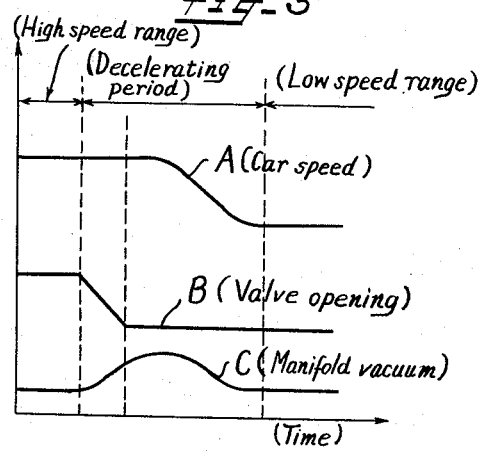
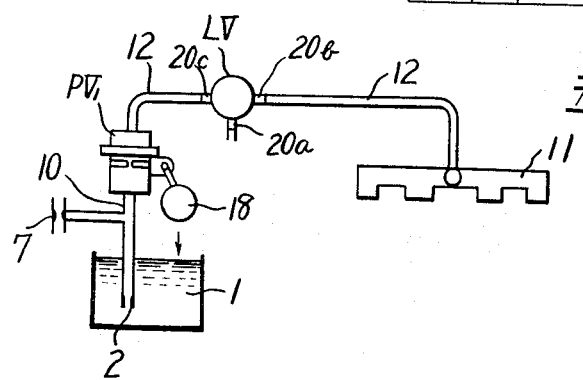

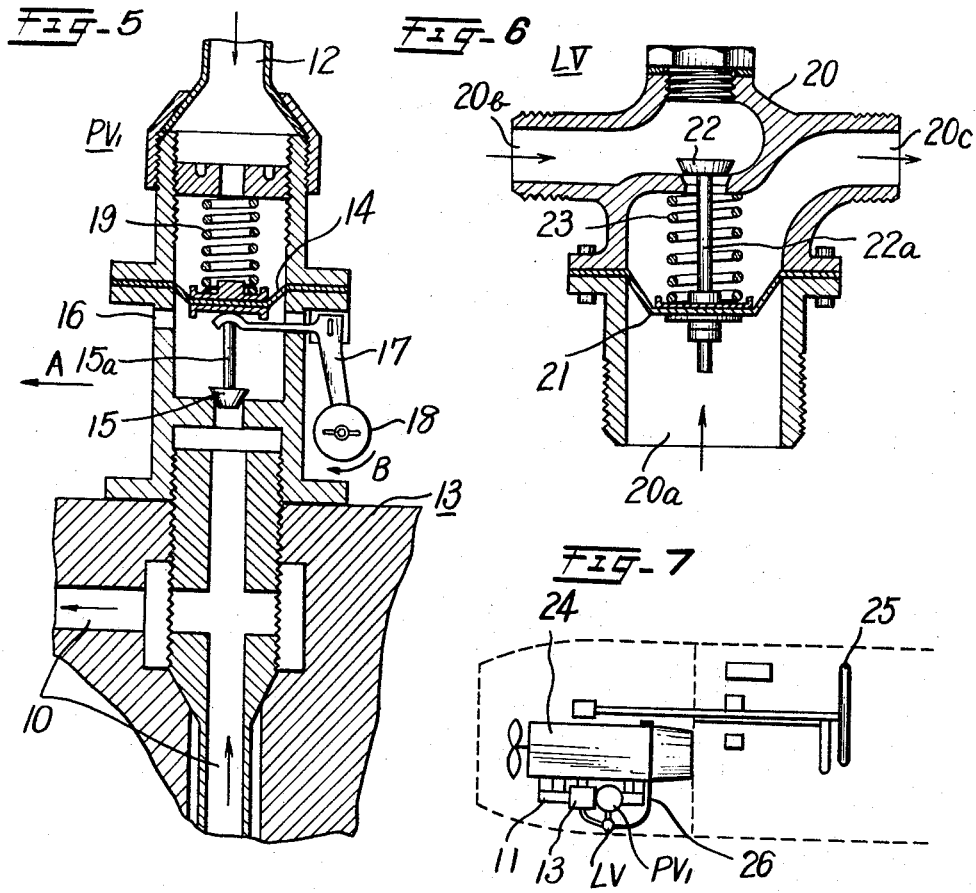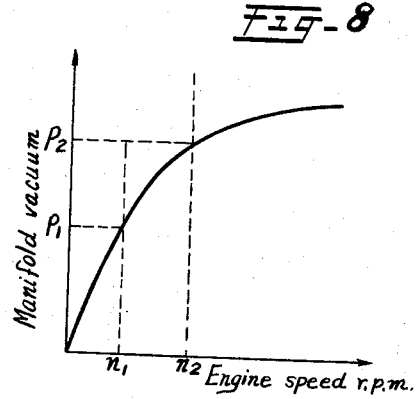

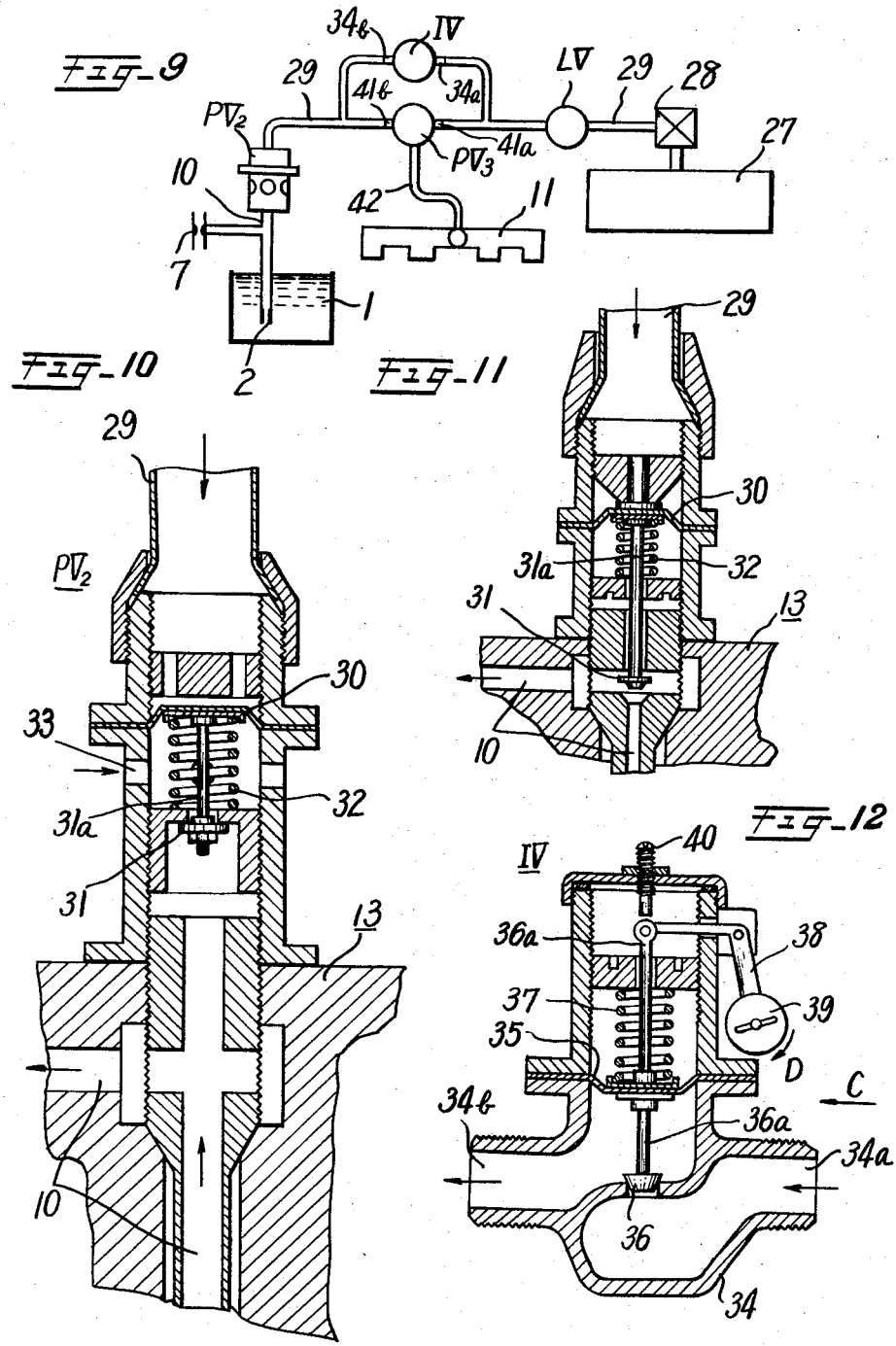

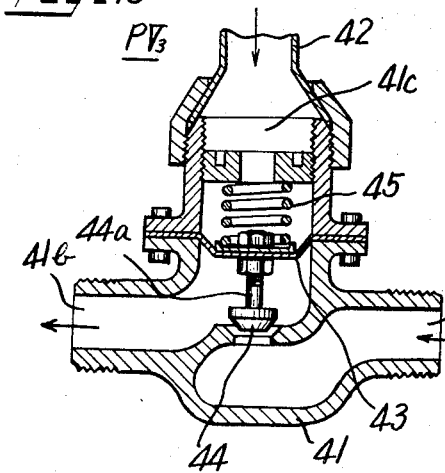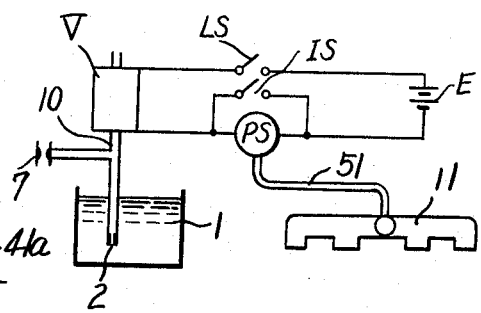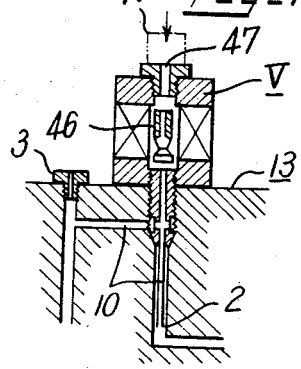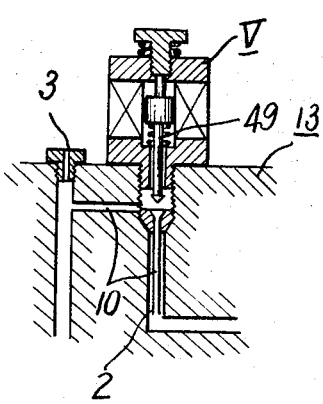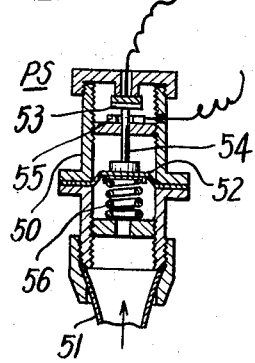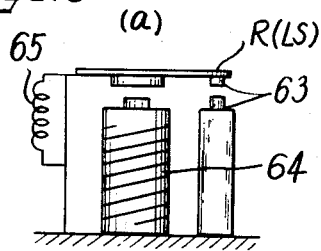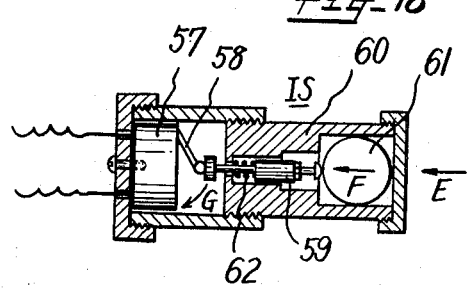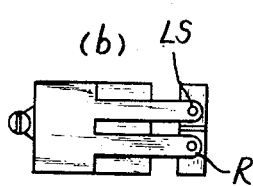

United States Patent Office 3,327,694
Patented June 27, 1967

3,327,694
FUEL SAVING DEVICE FOR AN AUTOMOBILE HAVING A CARBURETOR
Hajime Ariga, Yokohama, Japan, assignor to Nissan Jidosha Kabushiki Kaisha, Yokohama, Japan
Filed Oct. 13, 1965, Ser. No. 495,535
7 Claims. (Cl. 123—97)

ABSTRACT OF THE DISCLOSURE

A fuel saving device for an automobile having a carburetor, comprising a control valve for interrupting the fuel flow to the idling system to the carburetor in response to low pressure at the intake manifold of the engine, or deceleration of the automobile, and a pressure valve for deactivating the control valve in response to a decreased engine oil pressure, whereby the fuel supply to the carburetor idling system is interrupted only when the engine is braked or the automobile is decelerated while maintaining the fuel supply to the carburetor idling system when the engine is run continuously at low speed.

This invention relates to a device for saving fuel in an automobile having a carburetor, and has for its object to attain the fuel saving and the following advantages.

(1) Saving in fuel cost.
(2) Preventing air pollution due to incomplete combustion of fuels.
(3) Preventing noises due to popping.
(4) Extending the engine life.
(5) Improving the effectiveness of engine as a brake and the safety of vehicle.

Generally speaking, most automobiles are provided with carburetors having idling system therein and it is not necessary to supply fuels to said idling system when the engine is used as a brake and during transition into deceleration, whereas, in practice, fuels are fed to the idling system and exhausted in vain even during said conditions.

The principal object of the invention is to provide a novel device for shutting off automatically normally wasted fuel supply without sacrificing any conventional operative properties of the automobile engine under normal running conditions.

In general, a pressure valve is coupled to the carburetor to control the fuel passing through the idling system portion of the automobile carburetor, the valve being responsive to the vacuum pressure of the automobile engine manifold and operative upon the vacuum exceeding a certain predetermined level below atmospheric pressure or upon deceleration of the automobile itself. A second valve is inserted in series between the pressure valve and the manifold of the automobile engine and is operative when the engine is running at a sustained slow speed to prevent operation of the pressure valve.

In one form of the invention, the pressure valve is operatively coupled to the fuel passageway between the carburetor flow chamber and the idling jet opening and step nozzle which opens up into the main carburetor air flow passageway in the area of the throttle valve and downstream of the conventional venturi. The pressure valve may be actuated by fluid pressure from a stored fluid pressure source and the connection between the stored fluid pressure source and the pressure valve itself is controlled by two series connected valves constituting a first valve which is opened by the negative pressure in the manifold of the automobile engine when it exceeds a certain predetermined minimum level and a second valve which is normally open but closed when the automobile is running at a sustained slow speed. A third valve is fluid connected in parallel with the first valve and opens only in response to deceleration of the automobile for fluid connecting the stored fluid pressure source and the pressure valve operating on the idling fuel system of the carburetor itself.

In yet another form of the invention, a solenoid valve is mounted on the fuel oil passageway and acts to selectively shut off fluid flow through the idling system of the carburetor. This system further includes two series-connected switches comprising a first switch which is normally open but closed in response to a negative pressure in the manifold exceeding a certain predetermined level and a second switch which is normally closed but is opened when the automobile is running at a sustained slow speed. The first and second switches are inserted in series between the solenoid valve and a source of current. A third switch which is normally open but closed upon deceleration of the automobile is connected in the electrical circuit in parallel with the first switch, thereby shutting off the fuel supply to the idling system of the carburetor in response to actuation of the solenoid valve only when the engine is braked or decelerated but not when the engine is running at a sustained slow speed.

For a better understanding of the invention, reference is taken to the accompanying drawings, in which FIG. 1 is a sectional view illustrating fuel flow in a conventional idling system of carburetor;

FIG. 2 is a partial view of the same illustrating conditions during the transition into decelerating of the automobile;

FIG. 3 are characteristic curves illustrating the relationship of the degree of throttle valve opening and the rate of fuel consumption in the idling system to the automobile speed during transition into deceleration;

FIG. 4 is a diagrammatic illustration of an embodiment of the invention;

FIGS. 5 and 6 are sectional views of valves to be used in the same;

FIG. 7 is a diagrammatic arrangement of the same when mounted on an automobile;

FIG. 8 is a curve illustrating the relation between the engine speed and the pressure at the manifold of the engine when the throttle valve is at its full-closed position;

FIG. 9 is a diagrammatic illustration of another embodiment of the invention;

FIGS. 10 to 13 are sectional views showing valves to be used in the same;

FIG. 14 is a diagrammatic illustration of still another embodiment of the invention;

FIGS. 15 to 18 are sectional views of valves to be used in the same; and

FIGS. 19(a) and 19(b) are an elevation and a plan view respectively of a limit switch to be used in the same.

The same reference numerals and characters refer to the same or corresponding parts throughout the accompanying drawings.

Referring to FIG. 1 illustrating operative principles of fuel flow in a conventional idling system of a carburetor, reference numeral 1 designates a fuel tank in the carburetor, 2 an idling jet, 3 an idling air bleed, 4 an idling jet opening, 5 a step nozzle, 6 a throttle valve, 7 a venturi member, 8 a main nozzle, and 9 an air filter.

When the throttle valve 6 is at its full-closed position (or idling position to be exact), as shown in FIG. 1, the negative pressure in the vicinity of the idling jet opening 4 is high, then the fuel in the fuel tank 1 is sucked through the idling jet 2 and mixed with air at the idling air bleed 3 to be ejected through the idling jet opening 4. The suction pressure P to suck up the fuel from the fuel tank 1 in this case can be given by P = Pressure in the fuel tank (approximately equal to an atmospheric pressure) — Pressure in the idling air bleed (less than an atmospheric pressure)

Therefore, the supply of fuel to the idling system of the carburetor can be shut off either by venting the fuel passageway of the idling system to the outside atmosphere to cause $P=0$ or by blocking directly the fuel passageway. It is an object of the invention to achieve such shut-off of fuel supply to the idling system of the carburetor and accordingly interruption of fuel flow through the idling jet opening 4, when the engine brake is applied and during transition into automobile deceleration.

FIG. 2 illustrates the carburetor during a transition into deceleration of the automobile from a certain constant speed to a lower speed, wherein as the throttle valve 6 is rotated from the position shown in FIG. 2 in the direction shown by an arrow S at a substantially constant angular velocity, the flow rate of the air passing thorugh the venturi member is reduced and the rate of fuel flow through the main nozzle 8 is also reduced accordingly, thereby the output of the engine is reduced at a rate proportional to said angular velocity of the throttle valve rotation. Thus the automobile speed is reduced as desired.

The reduction in the automobile speed is, however, somewhat delayed in time from said rotation of the throttle valve 6 due to the mechanical inertia inherent to the automobile during said transition, as illustrated in FIG. 3. For instance, the actual speed of the automobile during said transition, which is represented by Curve A in FIG. 3 sometimes exceeds that speed which corresponds to the degree of the throttle valve opening at the same moment, which is represented by Curve B. Thereby, the negative pressure in the proximity of the idling jet opening 4 and the step nozzle 5 is increased excessively as shown by Curve C. Such excessive pressure drop results in a considerable increase in the fuel flow through the carburetor during said transition.

Since there is no need for fuel to decelerate the automobile speed, it is preferred to shut off such unnecessary fuel flow through the carburetor. According to the invention, such fuel supply to the idling system of the carburetor is shut off completely during said transition either by venting the fuel passageway in the idling system to the outside air or by blocking such fuel passageway directly.

FIG. 4 shows a diagrammatic illustration of an embodiment of the device of the invention using pressure in the manifold of the engine wherein PV1 is a pressure valve mounted on the fuel passageway of the idling system, which is adapted to be opened either by the negative pressure in the manifold exceeding a certain predetermined level or by deceleration of the automobile, 10 the fuel passageway in the idling system of the carburetor, and 11 a manifold of the engine.

According to the invention, the pressure valve PV1 is connected to the manifold through a piping 12, and another valve LV to be opened when the engine is running at a sustained slow speed is inserted in series to said piping 12, thereby the fuel flow through the idling system of the carburetor is shut off by actuating said pressure valve when the engine acts as a brake and when the automobile is decelerated.

FIG. 5 illustrates an example of the pressure valve PV1 in said embodiment, wherein 13 is a carburetor, 14 a diaphragm, 15 a valve connected to said diaphragm 14 by a valve rod 15a, 16 openings leading to the outside air, 17 a bell crank having a weight member 18 at one end thereof to urge the other end thereof against the diaphragm 14, and 19 a spring.

FIG. 6 shows an example of the release valve LV in the embodiment shown in FIG. 4, wherein the valve casing 20 has an opening 20a leading to the lubricating oil of the engine, another opening 20b leading to the manifold of the engine, and still another opening 20c leading to the pressure valve PV1, and 21 is a diaphragm, 22 a valve connected to the diaphragm 21 by a valve rod 22a, and 23 a spring.

FIG. 7 is a diagrammatic arrangement of the embodiment of the invention shown in FIG. 4 mounted on an automobile, wherein 24 is the automobile engine and 25 a steering wheel.

The operation of the fuel saving device shown in FIGS. 4 to 7 will be now described in further detail.

(1) *Response to application of the engine as a brake*

The negative pressure at the manifold of the engine is increased rapidly if the revolving speed of the engine is increased when the throttle valve is kept at its full-closed position, however, the rate of increase in the negative pressure is slowed down when the engine speed exceeds a certain level and the negative pressure is going to be saturated as the engine speed is further increased, as illustrated in FIG. 8. In FIG. 8, it is shown that when the engine speed is increased from the idling speed $n1$ to a certain speed $n2$, the negative pressure at the manifold is increased rapidly from $p1$ to $p2$. If the engine speed is further increased exceeding $n2$, the rate of the negative pressure increase is slowed down. In practice, such operation of the engine takes place when engine is acting to brake the automobile.

Therefore, if the pressure valve PV1 of the fuel saving device is set so as to be actuated only for the negative pressure higher than $p2$ but never actuated for the negative pressure equal to or less than $p2$, then the pressure valve PV1 is opened by the negative pressure at the manifold only when the engine is acting as a brake. In other words, the diaphragm 14 of the valve LV1, as shown in FIG. 5, is pushed upwards, resulting in upward movement of the valve 15 connected to the diaphragm by the valve rod 15a, thereby the fuel passageway 10 in the idling system of the carburetor is vented to the outside air through the opening 16 of the valve. Thus the fuel supply through the idling system is shut off.

The slow speed release valve LV is kept open throughout the above operation for shutting off the fuel supply through the idling system responsive to the application of the engine brake.

Thus wasteful fuel consumption accompanying the application of engine brake can be avoided by mounting the fuel saving device of the invention on the automobile.

(2) *Response to deceleration of automobile*

Upon deceleration of the automobile speed, there appears a decelerating force acting on the automobile in the direction of its movement as shown by an arrow A in FIG. 5, thereby the weight member 18 is accelerated and rotated in a direction as shown by an arrow B to push up the diaphragm 14 through the bell crank 17.

Accordingly, the valve 15 is pushed upwards together with the valve rod 15a, causing the valve 15 to move away from the valve seat, thus the fuel passageway 10 in the idling system is vented to the outside air through the opening 16 of the valve PV1 and the fuel supply to the idling system is shut off to avoid the wasteful fuel consumption during automobile deceleration.

The slow speed release valve LV is also kept open throughout the above operation for shutting off the fuel supply through the idling system responsive to deceleration of the automobile.

(3) *Response to sustained slow speed running of the automobile*

It is desirable to release said fuel saving device from operation when the automobile is running at a sustained slow speed with the throttle valve at its full-closed position or running with the speed change gear at the low speed position or reverse position. If the fuel supply through the idling system is shut off completely when the automobile is running under the above mentioned conditions, engine knocking is increased and the engine may stop.

The slow speed release valve LV in the system of FIG. 4 is provided to release the fuel saving device for the above purpose, and an example of such release valve is shown in FIG. 6.

It is well known that the pressure of the lubricating oil in the engine varies in response to the engine speed. If the pressure of the engine lubricating oil is led to the opening 20a of the valve LV of FIG. 6, then the valve 22 can be kept at its full-open position as long as the engine is running at normal speed due to the fact that the lubricating oil pressure applied on the diaphragm 21 under such conditions is high enough to move the diaphragm upwards. Upon reduction of the engine speed, the oil pressure acting on the diaphragm 21 is reduced and it is pressed downwards by the elastic force of the spring 23, thereby the valve 22 is brought down to its full-closed position by the valve rod 22a.

Then the communication through the conduit 12 is interrupted, and accordingly the transmission of the negative pressure at the engine manifold to the pressure valve PV1 is shut off. Thus the operation of the fuel saving device of the invention ceases.

FIG. 9 illustrates another embodiment of the invention using air pressure from a separately mounted compressed air tank 27 through a pressure regulating valve 28.

According to the embodiment shown in FIGURE 9, the pressure valve PV2, to be actuated by positive air pressure from the compressed air tank 27, is coupled to the carburetor and controls fuel passing through the idling system fuel passageway 10. The system further comprises another pressure valve PV3 which is actuated when the negative pressure in the manifold 11 increases beyond a certain predetermined value, a release valve LV which is normally closed but opens when the engine is running above a certain sustained speed and a pressure regulating valve 28, all fluid connected in series between the source of pressurized air 27 and the positive pressurized air actuated valve PV2. In addition, an inertia valve IV to be opened upon deceleration of the automobile is connected in parallel with the pressure valve PV3.

Thereby, the fuel supply through the idling system of the carburetor is shut off by means of pressure valve PV2 when the engine acts as a brake and upon deceleration of the automobile.

FIG. 10 illustrates an example of the pressure valve PV2 in the fuel saving device of the invention as shown in FIG. 9, wherein 30 represents a diaphragm, 31 a valve solidly joined to said diaphragm 30 by a valve rod 31a, 32 a spring, and 33 openings to vent the fuel passageway to the outside atmosphere.

FIG. 11 illustrates an example of said pressure valve PV2 which is adapted to block up the fuel passageway in the idling system of the carburetor instead of venting it, in which a valve 31 blocks up the fuel passageway 10 but no opening is provided to vent it to the outside air.

FIG. 12 shows an example of said inertia valve IV, wherein 34 is the valve casing, 34a an opening leading towards said compressed air tank 27, 34b another opening leading towards said pressure valve PV2, 35 a diaphragm, 36 a valve joined rigidly to said diaphragm 35 by a valve rod 36a, 37 a spring, 38 a bell crank having a weight member 39 at one end thereof to actuate the movement of the other end connected to said valve rod 36a, and 40 an adjusting screw.

FIG. 13 illustrates an example of said valve PV3 to be actuated by the negative pressure in the manifold of the engine, wherein 41 is a valve casing having an opening 41a leading to said compressed air tank 27, an opening 41b leading to said pressure valve PV2, and an opening 41c leading to the manifold of the engine, 42 a conduit connecting said opening 41c to the manifold of the engine, 43 a diaphragm, 44 a valve joined solidly to said diaphragm 43 by a valve rod 43a, and 45 a spring.

The valve shown in FIG. 6 can be also used as the release valve LV in the embodiment of FIG. 9 in order to release the fuel saving device from operation when the automobile is running at a sustained slow speed.

In the fuel saving device of FIG. 9, if the engine brake is applied, the negative pressure in the engine manifold 11 is increased, and as soon as said negative pressure exceeds a certain predetermined value, the diaphragm 43 in the valve PV3 is pushed upwards over-coming the elastic force of the spring 45, and thereby the valve 44 is moved away from the corresponding valve seat. Accordingly, the air in the compressed air tank 27 rushes into the pressure valve PV2 through the air conduit 29, the pressure regulating valve 30, the release valve LV (to be kept open under the present condition) and pressure valve PV3. Then, the diaphragm 30 of the pressure valve PV2 shown in FIG. 10 or FIG. 11 is pushed downwards surpassing the elastic force of the spring 32, thereby the fuel supply through the idling system of the carburetor is shut off by venting the fuel passageway to the outside air or by blocking up the passageway directly.

On the other hand, if the automobile is decelerated, a decelerating force acts on the inertia valve IV in the direction of the automobile movement, as shown by an arrow C in FIG. 12, and the weight member 39 is rotated in the direction as shown by an arrow D in FIG. 12 due to said decelerating force, thereby the valve 36 is pushed upwards away from its corresponding valve seat by raising the diaphragm 35 with the bell crank 38. Accordingly the air in the compressed air tank 27 rushes into the pressure valve PV2 to shut off the fuel supply through the idling system of the carburetor.

The release valve LV is closed as soon as the steady speed of the engine is reduced below a certain predetermined level due to reduction in pressure of the lubricating oil in the engine, thereby the air conduit 29 is blocked up. Then, it is apparent that the pressure valve PV2 will not be actuated even if one or both of the manifold pressure responsive valve PV3 and the inertia valve IV are opened, thus the fuel saving device of the invention is released from operation for sustained slow speed running of the automobile.

FIG. 14 illustrates another embodiment of the invention using a storage battery E mounted on the automobile as the power source for actuating a valve to shut off the fuel flow to the idling system of the carburetor.

According to the embodiment shown in FIG. 14, a solenoid valve V is operatively coupled to the fuel passageway in the idling system of the carburetor, and two series connected switches, which comprise a switch PS to be closed when the negative pressure in the manifold of the engine exceeds a certain predetermined value and a release switch LS to be opened when the automobile is running at a sustained slow speed, are connected in series to the control circuit of said solenoid valve V. An inertia switch IS, to be closed upon deceleration of the automobile, is connected in parallel with said switch PS, responsive to the negative pressure in the engine manifold. Thereby, the fuel supply through the idling system of the carburetor is shut off by actuating the solenoid valve V when the engine acts as a brake and upon deceleration of the automobile.

FIG. 15 shows an example of said solenoid valve V, which is adapted to vent the fuel passageway in the idling system to the outside air, whilst FIG. 16 shows another type solenoid valve to be used in the fuel saving device of FIG. 14, which is adapted to block up the fuel passageway directly, wherein 46 is a movable valve rod, 47 an opening leading to the outside air, 48 an air filter, and 49 a needle valve.

FIG. 17 illustrates an example of the switch PS responsive to the negative pressure in the engine manifold, wherein 50 is a valve casing, 51 a conduit connecting the valve casing 50 to the manifold 11 of the engine, 52 a diaphragm, 53 a movable contact joined to said diaphragm solidly by a link 54 so as to bring the movable contact 53 into direct contact with a stationary contact 55, and 56 a spring.

FIG. 18 illustrates an example of the inertia switch IS, in which 57 is a limit switch having a contact arm 58, 59 a slidable rod adapted to move relative to the casing 60 while maintaining the contact with the free end of the contact arm 58, 61 a spherical weight member inserted in a space in said casing 60 and adapted to reciprocate a short distance in the direction of the automobile movement and 62 a spring to push back said slidable rod 59.

FIGS. 19(a) and 19(b) are sketches showing an elevation and a plan view respectively of an example of the relase switch LV to release the fuel saving device of FIG. 14 from operation when the automobile is running at a sustained slow speed based on the function of the cut-out relay R, wherein 63 are switch contacts, 64 an electromagnet, and 65 a spring.

In the fuel saving device shown in FIG. 14, if the engine brake is applied, the negative pressure in the engine manifold 11 is increased, and as soon as the negative pressure exceeds a certain predetermined value, the diaphragm 52 in the switch PS is pushed downwards in response to said negative pressure overcoming the elastic force of the spring 56. The movable contact 53 and the link 54 are pulled down and the movable contact 53 is brought into contact with the stationary contact 55. Since the cut-out relay R is closed when the engine acts as a brake, the release switch LS is also closed under the present condition, thereby the control circuit of the solenoid valve V is closed completely. The solenoid valve V is then actuated and the fuel flow through the idling system of the carburetor is shut off either by venting the fuel passageway 10 of the idling system to the outside air as in the case of using a solenoid valve shown in FIG. 15 or by blocking fuel passageway 10 directly as in the case of using a solenoid valve shown in FIG. 16.

On the other hand, upon deceleration of the automobile, a decelerating force acts on the inertia switch IS in the direction of the automobile movement as shown by an arrow E in FIG. 18, thereby the spherical weight member 61 is moved in the direction as shown by an arrow F. Accordingly, the contact arm 58 of the limit switch 57 is rotated in the direction as shown by an arrow G by the slidable rod 59, and the limit switch 57 is closed. Since the release switch LS is also closed during the deceleration of the automobile, the control circuit of the solenoid valve V is completed upon closing of the inertia switch IS. Thus, the fuel flow through the idling system of the carburetor is shut off in the similar manner to the preceding case of applying the engine brake.

When the automobile is running at a sustained slow speed, the output power of the generator mounted on the automobile is reduced, and as soon as the output voltage of said generator is lowered below a certain predetermined value, the attraction of the electromagnet 64 shown in FIG. 19(a) is so reduced that the contacts 63 of the cut-out relay R is opened by the elastic force of the spring 65. Since the electrical contacts of the release switch LS is gang-operated in conjunction with said cut-out relay R, no sooner than the cut-out relay R is opened than the release switch LS is opened. The control circuit of the solenoid valve V is opened and the solenoid valve is de-energized as long as the release switch LS is opened. The fuel saving device of the invention shown in FIG. 14 is thus released from operation even if either or both of the manifold pressure responsive switch PS and the inertia switch IS are closed.

The fuel saving device of the invention can be completed by assembling the elements as described in the systems illustrated in any of FIGS. 4, 7 and 14, and it is apparent to those skilled in the art that elements suitable for achieving the objects of the invention are not limited to those described in the foregoing and illustrated in the accompanying drawings, but any other element which fulfills the equivalent functions can be also utilized.

The salient features of the fuel saving device of the invention are as follows:

(1) The device of the invention can be applied to any internal combustion engine having a carburetor. Accordingly, the fuel saving device of the invention can be applied in various different fields of industries.

(2) Conventional carburetors can be used continuously even after mounting the fuel saving device of the invention on them due to the fact that the modification necessary for mounting the latter is nominal.

(3) The fuel saving device can be assembled by using conventional machine elements, and the device can be mounted easily and manufactured at a low cost.

(4) The construction of the fuel saving device is simple, and its operation is highly reliable and the device is endurable.

(5) The fuel saving device can be modified at will and with ease for different applications.

(6) The fuel saving device of the invention is safe, due to the fact that the application of the device does not affect the normal running conditions of the automobile, and even if the device should fail, the effects of such failure is limited to the device per se and normal operation of the automobile is not affected at all.

(7) No precision work is necessary in mounting the device of the invention because none of the switches and the valves of the device is gang-operated with the movable parts of the automobile such as the accelerator pedal, clutch pedal, speed shift gear handle, etc.

What I claim is:

1. A fuel saving system for an automobile having an engine, an intake manifold and a carburetor including an idling fuel passageway, said system comprising: a main control valve to prevent fuel from passing through said idling passageway, first control means responsive to automobile inertia for actuating said main control valve, and second control means responsive to a predetermined vacuum within said intake manifold for actuating said main control valve, and means responsive to sustained slow speed operation of said engine for preventing actuation of said first and second control means.

2. A system for saving fuel in an automobile having an engine, an intake manifold and a carburetor including an idling fuel passageway for supplying fuel to said engine through said intake manifold, comprising: a vacuum responsive pressure valve for preventing fuel from passing through said idling passageway, means for fluid coupling said pressure valve to said intake manifold, said vacuum responsive pressure valve including a valve member, means for biasing said valve member into a first position allowing fuel to pass through said idling passageway, a diaphragm coupled to said valve member and responsive to predetermined vacuum in said manifold for moving said valve member to a second position preventing fuel from passing therethrough, a weight, means for mounting said weight for movement in response to automobile deceleration, and means for coupling said weight to said valve member for moving said valve member from its first position to its second position in response to automobile deceleration, and valve means positioned between said manifold and said vacuum responsive pressure valve and responsive to engine lubricating oil pressure for disconnecting said intake manifold from said vacuum responsive pressure valve when said automobile engine is running at a sustained slow speed.

3. The system as claimed in claim 1 wherein said system further includes a separate source of positive fluid pressure for operating the pressure operated valve and said main control valve is a pressure operated valve, said first control means comprises a normally closed valve positioned between said pressure operated main control valve and said source of positive fluid pressure, and said second control means comprises a normally closed valve operatively positioned between said source of positive fluid pressure and said pressure operated main control valve and in parallel with said first control valve.

4. The system as claimed in claim 1 wherein said main control valve includes a solenoid valve operator and a source of electrical current for energizing the same, said first control means comprises a switch positioned between said current source and said solenoid and in parallel with said first switch, said second control means comprises a series-connected switch and means for closing said switch in response to a predetermined negative pressure within said manifold, and said means responsive to sustained slow speed operation of said engine for preventing actuation of either of said first and second control means comprises a normally closed switch connected in series with said solenoid, said source of current and both said first and second switches and responsive to engine oil pressure.

5. A fuel saving device for an automobile having an engine, including a carburetor with an idling fuel passageway terminating in an idling nozzle and a step nozzle, an intake manifold and an engine oiling system whose pressure is decreased as the engine speed is reduced, said system comprising: a control valve for interrupting fuel flow through said fuel passageway to both said idling nozzle and said step nozzle, said control valve including pressure responsive means for actuating the same, first piping means for transmitting the pressure of said intake manifold to said pressure responsive control valve, a pressure operated valve operatively coupled to said first piping means between said main pressure operated control valve and said manifold for interrupting the transmission of manifold pressure in response to reduction of engine oil pressure during sustained slow running of the automobile, whereby except where the automobile is run at a sustained slow speed, the fuel supply to the idling passageway is interrupted by said main control valve when either the engine is acting as a brake or when the automobile is decelerating.

6. A fuel saving system in accordance with claim 5 further including means operable upon actuation of said control valve for interrupting said fuel flow by allowing communication of said fuel passageway with said outside atmosphere.

7. A fuel saving system as claimed in claim 5 further including means operable upon control valve actuation to block said fuel passageway and interrupt said fuel flow.

References Cited
UNITED STATES PATENTS 2,432,166   12/1947   Mallory   180—82.1
2,848,202   8/1958   Leibing   123—97

MARK NEWMAN, *Primary Examiner.*

RALPH D. BLAKESLEE, *Examiner.*